(12) United States Patent
Jaber

(10) Patent No.: US 6,751,643 B2
(45) Date of Patent: Jun. 15, 2004

(54) BUTTERFLY-PROCESSING ELEMENT FOR EFFICIENT FAST FOURIER TRANSFORM METHOD AND APPARATUS

(75) Inventor: Marwan A Jaber, North-Montreal (CA)

(73) Assignee: Jaber Associates LLC, Montreal (CA)

( * ) Notice: Subject to any disclaimer, the term of this patent is extended or adjusted under 35 U.S.C. 154(b) by 587 days.

(21) Appl. No.: 09/768,812

(22) Filed: Jan. 24, 2001

(65) Prior Publication Data

US 2001/0032227 A1 Oct. 18, 2001

(51) Int. Cl.⁷ .............................................. G06F 17/14
(52) U.S. Cl. ....................................................... 708/409
(58) Field of Search .............................. 708/409, 404

(56) References Cited

U.S. PATENT DOCUMENTS

| | | | | |
|---|---|---|---|---|
| 4,344,151 A | * | 8/1982 | White | 708/622 |
| 4,689,762 A | * | 8/1987 | Thibodeau, Jr. | 708/409 |
| 5,343,208 A | * | 8/1994 | Chesley | 342/196 |

* cited by examiner

Primary Examiner—David H. Malzahn
(74) Attorney, Agent, or Firm—Allan Jacobson

(57) ABSTRACT

A Fast Fourier Transformation (FFT) method and apparatus is implemented using a radix-r butterfly design based on a reduced single phase of calculation, termed a butterfly-processing element (BPE). Butterfly calculations are each executed in the same number of iterations, and comprised of substantially identical butterfly-processing elements. The resulting algorithm, in which a number of parallel processors operate simultaneously by a single instruction sequence, reduces both the computational burden and the communication burden. The use of substantially identical butterfly-processing elements, repeated in combination to form a radix-r butterfly, enables the design of FFT butterflies containing identical structures and a systematic means of accessing the corresponding multiplier coefficients stored in memory. The butterfly-processing element substantially reduces the complexity of the radix-r butterfly, particularly for higher order radices. In particular, starting from the basic DFT equations, the adder matrix is factored and combined with the twiddle matrix to form a single phase of calculation. By grouping all the multiply calculations into one calculation phase and all the addition calculations into the remaining calculation phases, the total number of calculations is reduced and the degree of parallelism is increased. Trivial multiplications, encountered during the execution of particular butterflies, are avoided by simple checks on the coefficient addresses. An efficient address generator is provided to access or store the twiddle factors, the input data and the output data.

15 Claims, 10 Drawing Sheets

SIGNAL FLOW GRAPH OF THE RADIX-4 DIT BUTTERFLY

SFG OF THE RADIX-8 DIF BUTTERFLY

JABER'S RADIX-r DIF ENGINE

SIMPLIFIED JABER'S RADIX-r DIF ENGINE

JABER'S RADIX-r DIT ENGINE

SIMPLIFIED JABER'S RADIX-r DIT ENGINE

JABER'S RADIX-r DIF MODULE

JABER'S RADIX-r DIT MODULE

RADIX-8 DIT FFT ENGINE

RADIX-16 DIF FFT ENGINE

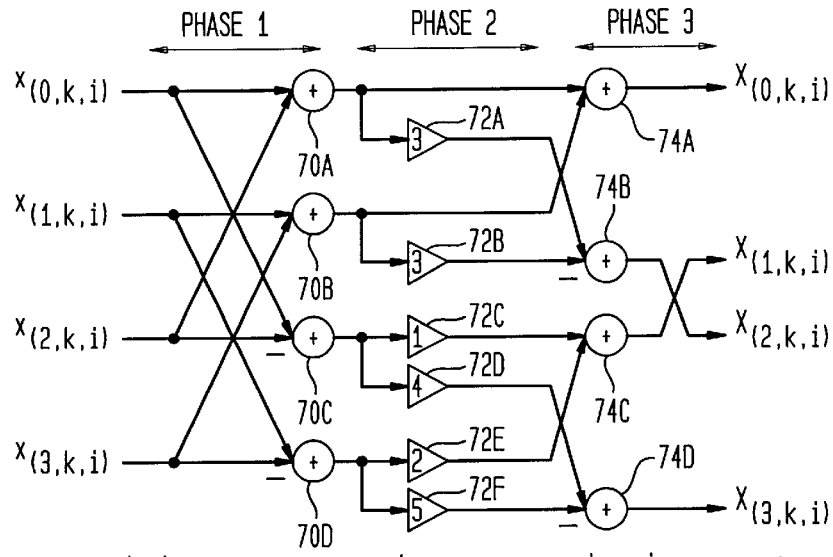

FIG. 7
HARDWARE REDUCTION IN RADIX-4 DIF JABER'S BUTTERFLY

WHERE $1=w^{((\tilde{N}(k/4^i)4^i))N}$, $2=w^{((N/4+\tilde{N}(k/4^i))) N}$, $3=w^{((\tilde{N}(k/4^i)2 \times 4^i))N}$, $4=w^{((\tilde{N}(k/4^i)3 \times 4^i))N}$, $5=w^{((N/4+\tilde{N}(k/4^i)3 \times 4^i))N}$

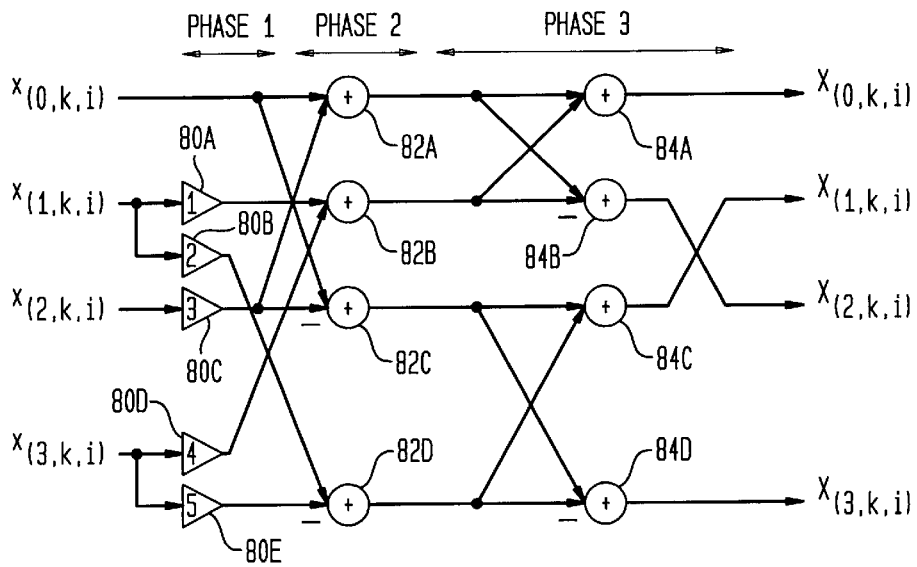

FIG. 8
HARDWARE REDUCTION IN RADIX-4 DIT JABER'S BUTTERFLY

WHERE $1=w^{((\tilde{N}(k/4^{(n-i)})4^{(n-i)}))N}$, $2=w^{((N/4+\tilde{N}(k/4^{(n-i)})4^{(n-i)}))N}$, $3=w^{((\tilde{N}(k/4^{(n-i)})2 \times 4^{(n-i)}))N}$, $4=w^{((\tilde{N}(k/4^{(n-i)})3 \times 4^{(n-i)}))N}$, $5=w^{((N/4+\tilde{N}(k/4^{(n-i)})3 \times 4^{(n-i)}))N}$

8 POINTS DFT

8 POINTS DFT OBTAINED BY COMBINING TWO FOUR POINTS DFT

8 POINTS DFT OBTAINED BY COMBINING FOUR TWO POINTS DFT

RADIX-2 BUTTERFLY COMPUTATION

BUTTERFLIES REPRESENTATION OF AN 8 POINTS FFT

IN PLACE FFT WITH BIT REVERSED INPUTS AND NORMALLY ORDERED OUTPUTS (r=2)

IN PLACE FFT WITH BIT REVERSED INPUTS AND NORMALLY ORDERED OUTPUTS

BUTTERFLY-PROCESSING ELEMENT FOR EFFICIENT FAST FOURIER TRANSFORM METHOD AND APPARATUS

FIELD OF THE INVENTION

The present invention relates to the field of Fast Fourier Transform analysis. In particular, the present invention relates to a butterfly-processing element (BPE) arranged as a plurality of parallel computing elements (comprising complex multipliers and adders) with identical structure and adapted for use to implement a Fast Fourier Transform (FFT) butterfly computation.

BACKGROUND OF THE INVENTION

Signal sensors measure a parameter of the physical world and convert the measured parameter to electrical form for transmission and processing. Typical examples are sound and video. Other sensed physical parameters, such as seismic activity, air temperature, vehicle position, velocity or acceleration, and the like, form the basis of electrical signals.

A signal may be represented in the time domain as a variable that changes with time. Alternatively, a signal may be represented in the frequency domain as energy at specific frequencies. In the time domain, a sampled data digital signal is a series of data points corresponding to the original physical parameter. In the frequency domain, a sampled data digital signal is represented in the form of a plurality of discrete frequency components such as sine waves. A sampled data signal is transformed from the time domain to the frequency domain by the use of the Discrete Fourier Transform (DFT). Conversely, a sampled data signal is transformed back from the frequency domain into the time domain by the use of the Inverse Discrete Fourier Transform (IDFT).

The Discrete Fourier Transform is a fundamental digital signal-processing transformation used in many applications. Frequency analysis provides spectral information about signals that are further examined or used in further processing. The DFT and IDFT permit a signal to be processed in the frequency domain. For example, frequency domain processing allows for the efficient computation of the convolution integral useful in linear filtering and for signal correlation analysis. Since the direct computation of the DFT requires a large number of arithmetic operations, the direct computation of the DFT is typically not used in real time applications.

Over the past few decades, a group of algorithms collectively known as Fast Fourier Transform (FFT) have found use in diverse applications, such as digital filtering, audio processing and spectral analysis for speech recognition. The FFT reduces the computational burden so that it may be used for real-time signal processing. In addition, the fields of applications for FFT analysis are continually expanding to include, Cepstrum analysis, image processing and video coding, radar and sonar processing including target detection, seismic analysis, advanced frequency division modulation schemes such as OFDM and power system reliability.

Computational Burden

Computation burden is a measure of the number of calculations required by an algorithm. The DFT process starts with a number of input data points and computes a number of output data points. For example, an 8-point DFT may have an 8-point output. See FIG. 9. The DFT function is a sum of products, i.e., multiplications to form product terms followed by the addition of product terms to accumulate a sum of products (multiply-accumulate, or MAC operations). See equation (1) below. The direct computation of the DFT requires a large number of such multiply-accumulate mathematical operations, especially as the number of input points is made larger. Multiplications by the twiddle factors $W_N^r$ dominate the arithmetic workload.

To reduce the computational burden imposed by the computationally intensive DFT, previous researchers developed the Fast Fourier Transform (FFT) algorithms in which the number of required mathematical operations is reduced. In one class of FFT methods, the computational burden is reduced based on the divide-and-conquer approach. The principle of the divide-and-conquer approach method is that a large problem is divided into smaller sub-problems that are easier to solve. In the FFT case, the division into sub-problems means that the input data are divided in subsets for which the DFT is computed to form partial DFTs. Then the DFT of the initial data is reconstructed from the partial DFTs. See N. W. Cooley and J. W. Tukey, "An algorithm for machine calculation of complex Fourier series", Math.Comput., Vol. 19 pp. 297–301, April 1965. There are two approaches to dividing (also called decimating) the larger calculation task into smaller calculation sub-tasks: decimation in frequency (DIF) and decimation in time (DIT).

Butterfly Implementation of the DFT

In the FFT, an 8-point DFT is divided into 2-point partial DFTs. The basic 2-point partial DFT is calculated in a computational element called a radix-2 butterfly (or butterfly-computing element) as represented in FIG. 12. A radix-2 butterfly has 2 inputs and 2 outputs, and computes a 2-point DFT. FIG. 13 shows an FTT using 12 radix-2 butterflies to compute an 8-point DFT. Butterfly-computing elements are arranged in stages. There are three stages 1302, 1304 and 1306 of butterfly calculation. Data, $x_n$ is input to the butterfly-computing elements in the first stage 1302. After the first stage 1302 of butterfly-computation is complete, the result in input to the next stage(s) of butterfly-computing element(s).

Four radix-2 butterflies operate in parallel in the first stage 1302. The outputs of the first stage 1302 are combined in 2 additional stages 1304, 1306 to form a complete 8-point DFT output, $X_n$. The output of the second stage 1304 of radix-2 butterflies is coupled to a third stage 1306 of four radix-2 butterflies. The output of the third stage 1306 of four radix-2 butterflies is the final 8-point DFT function, $X_n$.

FIG. 14 shows an FFT using 32 radix-2 butterflies to compute a 16-point DFT. There are 4 stages of butterfly calculation. Eight radix-2 butterflies operate in parallel in the first stage 1402 where 2-point partial DFTs are calculated. The outputs of the first stage are combined in 3 additional stages 1403, 1404 and 1406 to form a complete 16-point DFT output. The output of the second stage 1403 of 8 radix-2 butterflies is coupled to a third stage 1404 of 8 radix-2 butterflies. The output of the third stage 1404 of 8 radix-2 butterflies is coupled to a fourth stage 1406 of 8 radix-2 butterflies, the output of which the final 16-point DFT function.

Higher order butterflies may be used. See FIG. 15, which uses 8 radix-4 butterflies in 2 stages 1502, 1502 to compute a 16-point DFT. In general, a radix-r butterfly is a computing element that has r input points and calculates a partial DFT of r output points.

Communication Burden

A computational problem involving a large number of calculations may be performed one calculation at a time by using a single computing element. While such a solution uses a minimum of hardware, the time required to complete the calculation may be excessive. To speed up the calculation, a number of computing elements may be used in parallel to perform all or some of the calculations simultaneously. A massively parallel computation will tend to require an excessively large number of parallel computing elements. Even so, parallel computation is limited by the communication burden. For example, a large number of data and constants may have to be retrieved from memory over a finite capacity data bus. In addition, intermediate results from one stage may have to be completed before beginning a later stage calculation. The communication burden of an algorithm is a measure of the amount of data that must be moved, and the number of calculations that must be performed in sequence (i.e., that cannot be performed in parallel).

In particular, in an FFT butterfly implementation of the DFT, some of the butterfly calculations cannot be performed simultaneously, i.e., in parallel. Subsequent stages of butterflies cannot begin calculations until earlier stages of butterflies have completed prior calculations. The communication burden between stages of butterfly calculation cannot therefore be reduced through the use of parallel computation. While the FFT has a smaller computational burden as compared to the direct computation of the DFT, the butterfly implementation of the FFT has a greater communication burden.

Within the butterfly-computing element itself (i.e., within the radix-r butterfly), there are similar considerations of computational burden versus communication burden. That is, within the radix-r butterfly-computing element itself, not all the required calculations can be performed simultaneously by parallel computing elements. Intermediate results from one calculation are often required for a later computation. Thus, while the FFT butterfly implementation of the DFT reduces the computational burden, it does not decrease the communication burden.

Higher Radix Butterflies

Using a higher radix butterfly can reduce the communication burden. For example, a 16-point DFT may be computed in two stages of radix-4 butterflies as shown in FIG. 15, as compared to three stages in FIG. 13 or four stages in FIG. 14. Higher radix FFT algorithms are attractive for hardware implementation because of the reduced net number of complex multiplications (including trivial ones) and the reduced number of stages, which reduces the memory access rate requirement. The number of stages corresponds to the amount of global communication and/or memory accesses in an implementation. Thus, reducing the number of stages reduces the communication burden. FIG. 10 shows a mixed radix butterfly implementation of the FFT with two stages of butterfly computation. FIG. 11 shows a mixed radix butterfly implementation of the FFT with three stages of butterfly computation.

Typically, the higher order radix-r butterflies are not used, even though such butterflies will have a smaller net number of complex multiplications and such higher radix butterflies reduce the communication load. The reason higher order radix-r butterflies have not been more commonly used is that the complexity of the radix-r butterfly increases rapidly for higher radices. The increased complexity of the higher radices butterfly makes higher order radix-r butterflies difficult to implement. As a result, the vast majority of FFT processor implementations have used the radix-2 or radix-4 versions of the FFT algorithm. Therefore, in spite of the attractiveness of using a higher order radix butterfly in an FFT algorithm, hardware implementations of FFT algorithms with radices higher than radix-4 are rare.

SUMMARY OF THE INVENTION

Butterfly-processing Element (BPE) and the Radix-r Butterfly

The present invention is embodied in a butterfly-processing element (BPE), or engine, that can be utilized in an array of butterfly-processing elements (BPEs) each having substantially identical structures, to reduce the complexity in implementing radix-r FFT calculations. The approach is applicable to butterfly implementations in both DIF and DIT FFT algorithms.

In particular, the present invention is embodied in a BPE useful in building a radix-r butterfly with fewer calculations than that required in conventional implementations, thus reducing the computational burden. In addition, the present invention is embodied in a BPE, which results in a radix-r butterfly with a greater degree of parallelism and reduced number of calculation phases internal to the radix-r butterfly, thus increasing the radix-r butterfly-processing speed.

Furthermore, the use of the BPE of the present invention permits the implementation of higher order radix-r butterflies, which are useful in implementing FFT algorithms with a reduced number of stages, and therefore a reduced communication burden. Because the BPE is a basic building block for all radix-r butterflies, therefore, assembly of repeating BPEs can be used to easily create higher order radix-r butterflies. Furthermore, while the advantages of the present approach over the prior art apply to all radix-r butterflies, the advantages are particularly apparent when applied to higher order radix-r butterflies (i.e., radix-8 and above).

Mathematical Basis

A mathematical term that is a function of r input points and provides a single output point is the basis for the design of the present BPE. To provide the insight forming the basis of the present BPE, the basic DFT equation is factored to group the variables used in multiplication (and simultaneously accessed from memory) into one matrix. In particular, starting from the basic DFT equations, the adder matrix is factored and combined with the twiddle matrix to form a single phase of calculation. By grouping all the multiply calculations into one calculation phase and all the addition calculations into the remaining calculation phases, the total number of calculations is reduced and the degree of parallelism is increased.

For a radix-r DIF butterfly, r identical BPEs are arranged in parallel. Each of the r identical BPEs are substantially identical to each other and are operated in parallel using the same instructions and accessing the necessary set of multiplier coefficients from memory at the same time. The outputs of the r identical BPEs form the DFT's r output points.

For a radix-r DIT butterfly, (r−1) identical BPEs are arranged in parallel. Each of the (r−1) identical BPEs is substantially identical to the others and operates in parallel using the same instructions and accessing the necessary set of multiplier constants from memory at the same time. The outputs of the (r−1) identical BPEs form the DFT as (r−1) of the r output points of the butterfly. The remaining output point ($X_0$) of the DFT is formed as the sum of the r input points.

Trivial multiplications encountered during the execution of particular butterflies may be avoided by simple checks on the coefficient addresses. Avoiding trivial multiplications reduces the computational load of particular butterflies.

An FFT implementation is composed of a plurality of radix-r butterflies with identical BPEs and a systematic addressing scheme for accessing the corresponding multiplier coefficients. Each radix-r butterfly utilizes the basic computing unit (BPE), with r (or r−1) complex multipliers in parallel to implement each of the butterfly computations' output. There is a simple mapping relationship from the three indices (FFT stage, radix-r butterfly, butterfly-processing element) to the addresses of the needed multiplier coefficients. The simple mapping from the three indices to the addresses of the necessary multiplier coefficients accommodates the complexity of higher order radix and mixed radix butterfly implementations of the DFT.

In a multiprocessor environment, much of the calculations are performed in parallel to greatly increase processing speed. Even for a single-processor environment, the invented architecture results in a reduced time delay for the complete FFT.

By using the BPE of the present invention in the implementation of the radix-r butterfly, an FFT implementation is achieved with a reduced number of calculations and a reduced number of stages of calculations. In addition, the amount of parallelism, both within the butterfly-processing element (BPE) calculation phases and within the overall FFT algorithm butterfly stages permits the use of parallel processing to increase overall FFT calculation speed.

Another aspect of the present invention is the address generator(s), which is used to access or store the twiddle factors, the input and the output data. In particular, the value of a specified twiddle factor is stored in a virtual memory location equal to its exponent (power). In other words the value of twiddle factor $w^0$ is stored into the twiddle factor memory at the address location 0 (as real or virtual address). In a similar manner, the input and output data are accessed or stored according to their perspective indices generated by the reading and writing address generators.

BRIEF DESCRIPTION OF THE DRAWINGS

FIG. 7 is a schematic representation of a radix-4 DIF butterfly with hardware reduction in accordance with the present invention.

FIG. 8 is a schematic representation of a radix-4 DIT butterfly with hardware reduction in accordance with the present invention.

DETAILED DESCRIPTION

Figure 1:
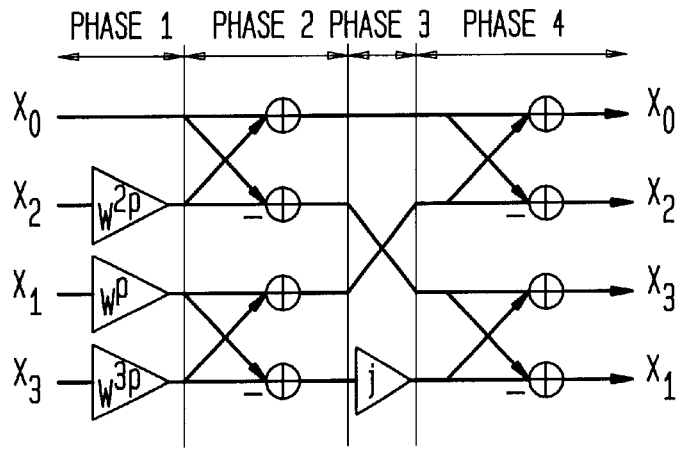
FIG. 1 is a signal flow graph of a radix-4 DIT butterfly in accordance with the prior art.

The definition of the DFT is shown in equation (1), $x_{(n)}$ is the input sequence, $X_{(k)}$ is the output sequence, N is the transform length and $w_N$ is the $N^{th}$ root of unity ($w_N = e^{-j2\pi/N}$). Both $x_{(n)}$ and $X_{(k)}$ are complex valued number sequences.

$$X_{(k)} = \sum_{n=0}^{n=N-1} x_{(n)} w_N^{nk}, k \in [0, N-1]. \tag{1}$$

From equation (1) it can be seen that the computational complexity of the DFT increases as the square of the transform length, and thus, becomes expensive for large N. A class of FFT methods, known as fast algorithms for DFT computation, is based on the divide-and-conquer approach. The principle of the divide-and-conquer approach method is that a large problem is divided into smaller sub-problems that are easier to solve. In the FFT case, the division into sub-problems means that the input data $x_n$ are divided in subsets on which the DFT is computed. Then the DFT of the initial data is reconstructed from these intermediate results. If this strategy is applied recursively to the intermediate DFTs, an FFT algorithm is obtained. Some of these methods are the Common Factor Algorithm, the Split-Radix Algorithm, the Prime Factor Algorithm and the Winograd Fourier Transform Algorithm (WFTA). Of particular interest is the in place (or butterfly) computation.

The main objective of many FFT algorithms is a reduction in computation and particularly the reduction in the amount of multiplication.

The basic operation of a radix-r butterfly PE is the so-called butterfly in which r inputs are combined to give the r outputs via the operation:

$$X = B_r \times x \tag{2},$$

where $x = [x_{(0)}, x_{(1)}, \ldots, x_{(r-1)}]^T$ is the input vector and $X = [X_{(0)}, X_{(1)}, \ldots X_{(r-1)}]^T$ is the output vector.

A special operator, $B_r$ is the r×r butterfly matrix, which can be expressed as $$B_r = W_N^r \times T_r \qquad (3)$$

for the decimation in frequency process, and $$B_r = T_r \times W_N^r \qquad (4)$$

for the decimation in time process.

$W_N^r = \text{diag}(1, w_N^p, w_N^{2p}, \ldots w_N^{(r-1)p})$ represents the twiddle factor and $T_r$ is an r×r matrix representing the adder-tree in the butterfly, where $$T_r = \begin{bmatrix} w^0 & w^0 & w^0 & - & w^0 \\ w^0 & w^{N/r} & w^{2N/r} & - & w^{(r-1)N/r} \\ w^0 & w^{2N/r} & w^{4N/r} & - & w^{2(r-1)N/r} \\ - & - & - & - & - \\ w^0 & w^{(r-1)N/r} & - & - & w^{(r-1)^2 N/r} \end{bmatrix} = [T_{(l,m)}], \qquad (5)$$

where $T_{(l,m)} = w^{((lm\frac{N}{r}))_N}$, (6)

l=m=0, ..., r−1 and $((x))_N$=x modulo N.

A higher radix butterfly will decrease the number of multiplications and the number of butterfly stages, which is the motivation for to implement a higher radix butterfly. Since the higher radix reduces the communication load by reducing the number of stages, the remaining problem is reduction of the computational burden. Factoring the adder matrix Tr (radix 4 case figure (1)) yielding to the following expression reduces the computational load.

$$T_4 = \begin{bmatrix} 1 & 1 & 1 & 1 \\ 1 & -j & -1 & j \\ 1 & -1 & 1 & -1 \\ 1 & j & -1 & -j \end{bmatrix} = \begin{bmatrix} 1 & 0 & 1 & 0 \\ 0 & 1 & 0 & -j \\ 1 & 0 & -1 & 0 \\ 0 & 1 & 0 & j \end{bmatrix} \times \begin{bmatrix} 1 & 0 & 1 & 0 \\ 1 & 0 & -1 & 0 \\ 0 & 1 & 0 & 1 \\ 0 & 1 & 0 & -1 \end{bmatrix}. \qquad (7)$$

As a result, there is a reduction of 4 complex additions for the radix-4 butterfly. For the radix-8 butterfly, there is a reduction of 32 complex additions, 4 real additions and 4 real multiplications. The reduction of calculations is due to the detection of trivial multiplications (i.e., by 1 or −1) and by incorporating (absorbing) the multiplications by j or −j in the addition operation by switching the real and imaginary parts of the data. As indicated, factoring the adder matrix reduces the number of required computations. Although the computation burden is reduced, the complexity of the implementation of such butterflies will increase for higher radices. Also, for higher radices, the number of non-trivial multiplications increases. In the case of the radix-8 algorithm illustrated in the signal flow graph of FIG. 2; the complexity of the radix-8 butterfly is shown to be significantly greater than for the radix-4 butterfly of FIG. 1. The non-trivial multiplications in the prior art radix-8 butterfly of FIG. 2 are: $w_8 = e^{-2\pi j/8}$, $-w_8$, $jw_8$ and $-jw_8$ See T. Widhe, "Efficient Implementation of FFT Processing Elements" Linköping studies in Science and Technology, Thesis No. 619, Linköping University, Sweden, June 1997.

An important observation in regard to the present invention is that both the adder matrix $T_r$ and the twiddle matrix $w_N^r$, contain twiddle factors. To control the variation of the twiddle factor during the calculation of a complete FFT, the twiddle factors and the adder matrix are incorporated in a single-phase of calculation.

The special operator $B_r$ is defined according to equation (3), where $B_r$ is the product of the twiddle factor matrix $w_N^r$ and the adder matrix $T_r$.

So, by defining $W_{(r, k, i)}$ the set of the twiddle factor matrices $W_N^r$ as:

$$W_{(r,k,i)} = \begin{bmatrix} w_{(0,k,i)} & 0 & - & 0 \\ 0 & w_{(1,k,i)} & - & 0 \\ - & - & - & - \\ 0 & 0 & - & w_{((r-1),k,i)} \end{bmatrix} = [w_{(l,m)(k,i)}], \qquad (8)$$

in which, $$w_{(l,m)(k,i)} = w^{((\tilde{N}(\frac{k}{r^i}))r^i))_N} \text{ for } 1 = m, \text{ and } 0 \text{ elsewhere}, \qquad (9)$$

therefore, the radix-r computation $B_{r\,DIF}$ will be expressed:

$$B_{r\,DIF} = W_{(r,k,i)} \times T_r = [B_{r\,DIF(l,m)(k,i)}] \qquad (10)$$

with $B_{r\,DIF(l,m)(k,i)} = w^{((l\,m\,N/r + \tilde{N}(k/r^i))/r^i))_N}$ (11), l=m=0, ..., r−1, i=0, 1 ..., n−1, k=0,1 ..., (N/r)−1, $((x))_N$ denotes x modulo N and $\tilde{N}(k/r^i)$ is defined as the integer part of the division of k and $r^i$.

As a result, the operation of a radix-r PE for the DIF FFT will formulated by:

the colon vector $X_{(r,k,i)} = B_{r\,DIF} \times x = [X_{(l)(k,i)}]$ (12), where the $l^{th}$ output $$X_{(l)(k,i)} = \sum_{m=0}^{r-1} x_{(m)} w^{((lmN/r + \tilde{N}(k/r^i)r^i))_N}, \qquad (13)$$

Using the same reasoning as for the radix-r DIF FFT above, the operation of a radix-r DIT FFT is derived below. In accordance with equation (4), $B_r$ is the product of the adder matrix $T_r$ and the twiddle factor matrix $W_N^r$, which is equal to:

$$B_{r\,DIT} = T_r \times W_{(r,k,i)} = [B_{r\,DIT(l,m)(k,i)}] \qquad (14),$$

in which $B_{r\,DIT(l,m)(k,i)} = w^{((lmN/r + \tilde{N}(k/r^{(n-i)})mr^{(n-i)}))_N}$ (15), and $$W_{(r,k,i)} = \begin{bmatrix} w_{(0,k,i)} & 0 & - & 0 \\ 0 & w_{(1,k,i)} & - & 0 \\ - & - & - & - \\ 0 & 0 & - & w_{((r-1),k,i)} \end{bmatrix} = [w_{(l,m)(k,i)}], \qquad (16)$$

where $w_{(l,m)(k,i)-w}^{((\tilde{N}(k/r^{(n-i)})mr^{(n-i)}))_N}$ for l=m, and 0 elsewhere (17), and n=(log N/log r)−1.

As a result, the operation of a radix-r PE for the DIT FFT will be:

the colon vector $X_{(r,k,i)} = B_{r\,DIT} \times x = [X_{(l)(k,i)}]$ (18), where the $l^{th}$ output $$X_{(l)(k,i)} = \sum_{m=0}^{r-1} x_{(m)} w^{((lmN/r + \tilde{N}(k/r^{(n-i)})mr^{(n-i)}))_N}. \qquad (19)$$

Radix-r Butterfly for an FFT Algorithm

The conceptual key to forming an FFT algorithm using the present invention is building radix-r FFT butterflies composed of BPEs having identical structures and a systematic means of accessing the corresponding multiplier coefficients stored in memory. The present approach reduces the number of required multipliers and adders.

Each butterfly-processing element utilizes either r complex multipliers in parallel (for a DIF implementation) or (r−1) complex multipliers in parallel (for a DIT implementation) to implement each of the butterfly computations. There is a simple mapping from the three indices (FFT stage, butterfly, processing element) to the addresses of the multiplier coefficients needed in FIGS. 3A and 4A. For a single processor environment, the present type of BPE would result in decrease the time delay for the complete FFT by a factor of O(r).

Figure 3A:
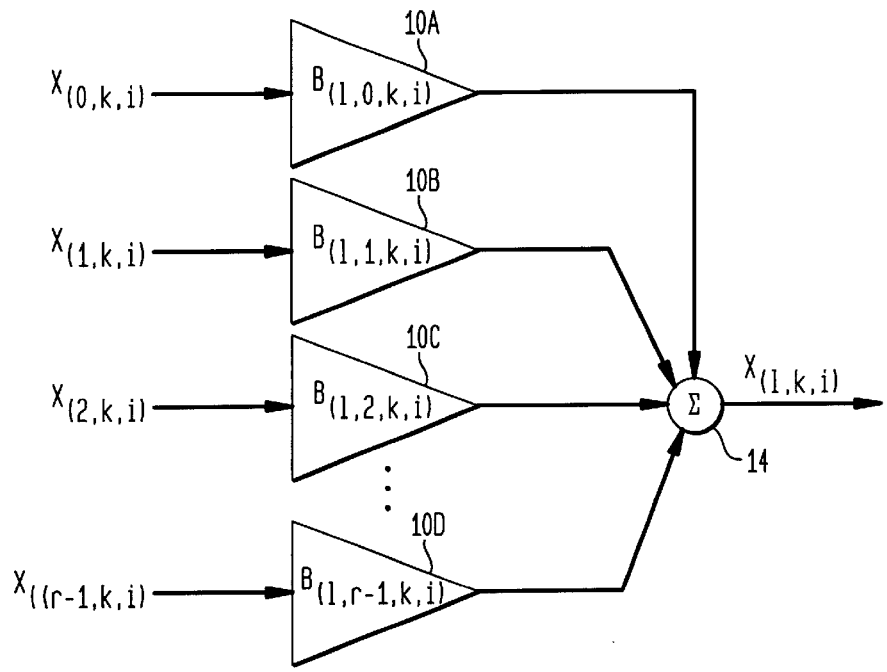
FIG. 3A is a schematic diagram of a DIF butterfly-processing element for an FFT algorithm in accordance with the present invention.
Figure 3B:
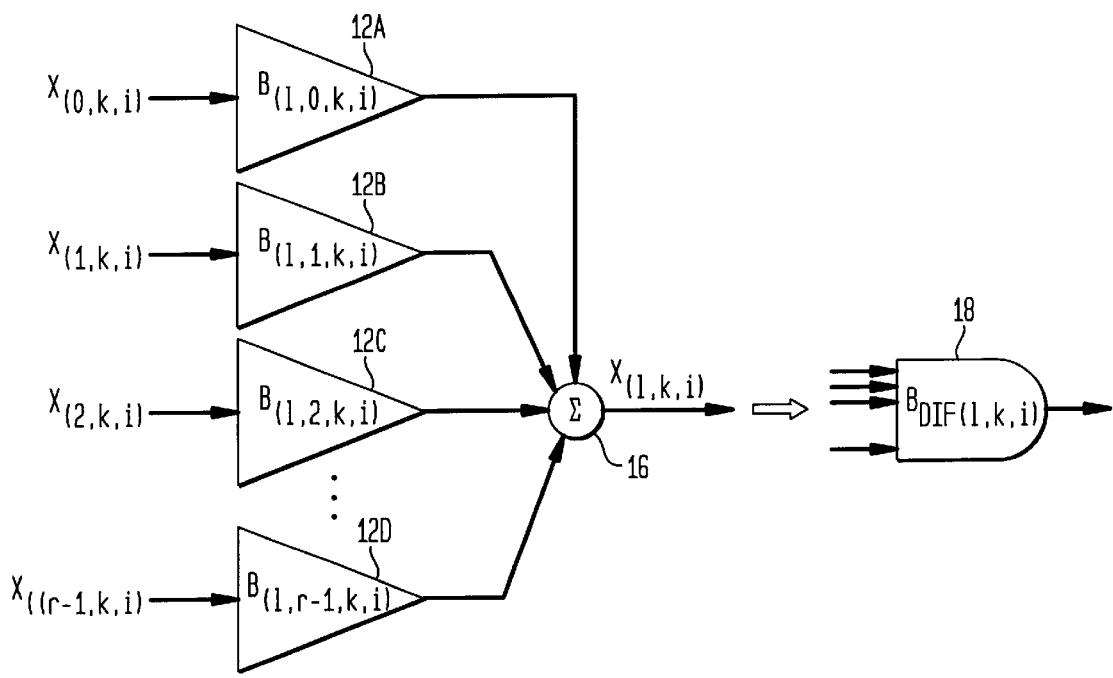
FIG. 3B is a shorthand representation of a DIF butterfly-processing element in accordance with the present invention.

FIGS. 3A and 3B illustrate a DIF BPE for an FFT in accordance with the present invention. A plurality of r complex multipliers 10A, 10B, 10C, 10D and an adder 14 are provided. One input of each multiplier 10A, 10B, 10C, 10D is coupled to each respective input data point of the input sequence, x. The outputs of each multiplier, 10A, 10B, 10C and 10D are coupled to the inputs of adder 14. The output of adder 14 is coupled to one of the output data points of the output sequence, X. As shown in FIG. 3B, a generalized butterfly-processing element 12A, 12B, 12C, 12D and 16 is represented by the specialized operator, $B_{r\ DIF}$.

Figure 4A:
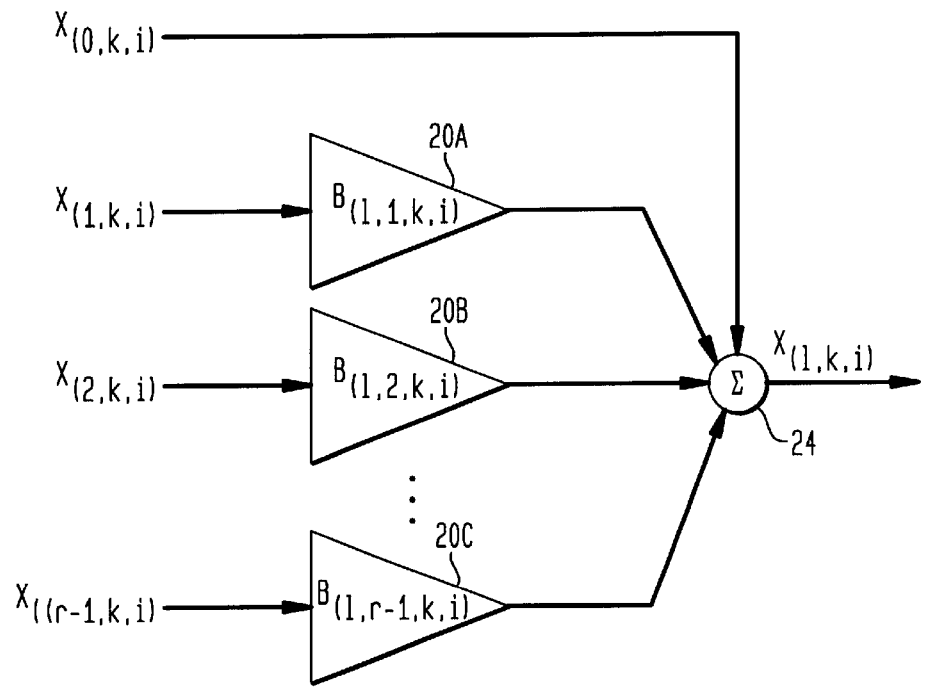
FIG. 4A is a schematic diagram of a DIT butterfly-processing element for an FFT algorithm in accordance with the present invention.
Figure 4B:
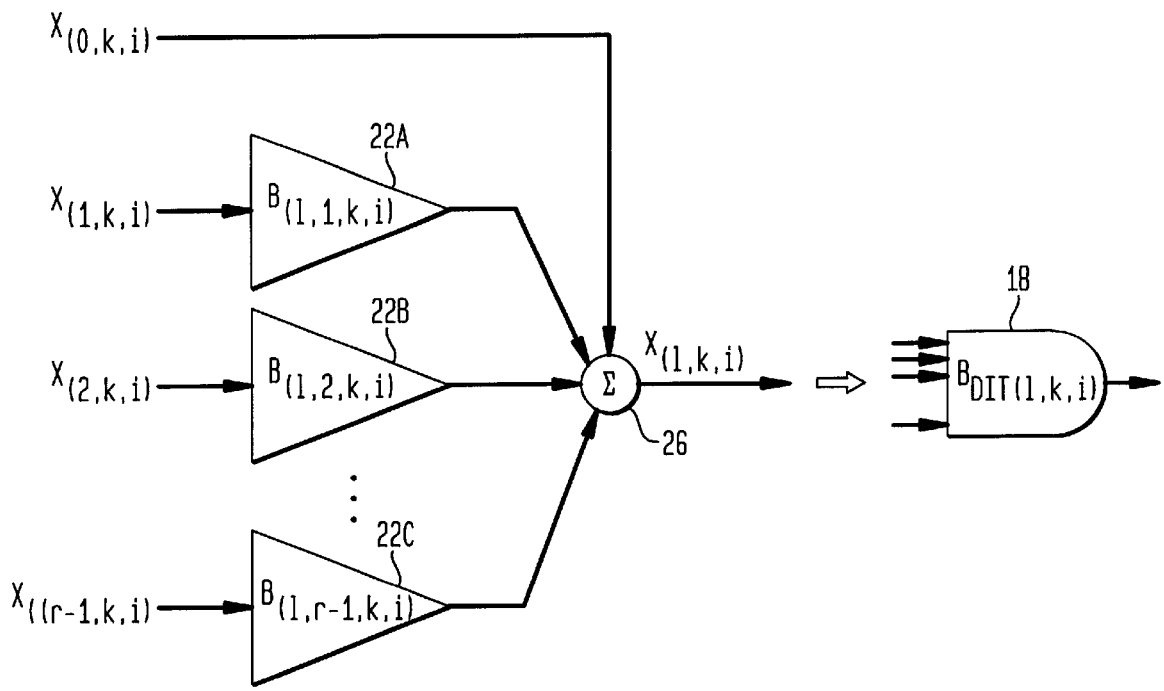
FIG. 4B is a shorthand representation of a DIT butterfly-processing element in accordance with the present invention.

FIGS. 4A and 4B illustrate a DIT butterfly-processing element (BPE) for an FFT in accordance with the present invention. A plurality of r complex multipliers 20A, 20B, 20C, 20D and an adder 24 are provided. One input of each multiplier 20A, 20B, 20C, 20D is coupled to each respective input data point of the input sequence, x. The outputs of each multiplier, 20A, 20B, 20C and 20D are coupled to the inputs of adder 24. The output of adder 24 is coupled to one of the output data points of the output sequence, X. As shown in FIG. 4B, the specialized operator, $B_{r\ DIT}$, represents a generalized butterfly-processing element 22A, 22B, 22C, 22D and 26.

Figure 5A:
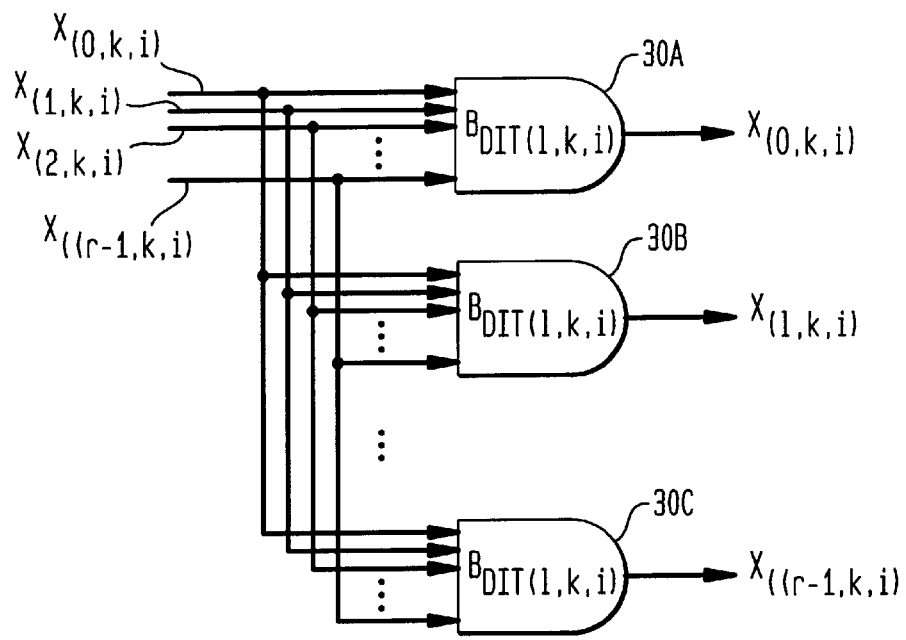
FIG. 5A is a schematic representation of a DIF butterfly in accordance with the present invention.
Figure 5B:
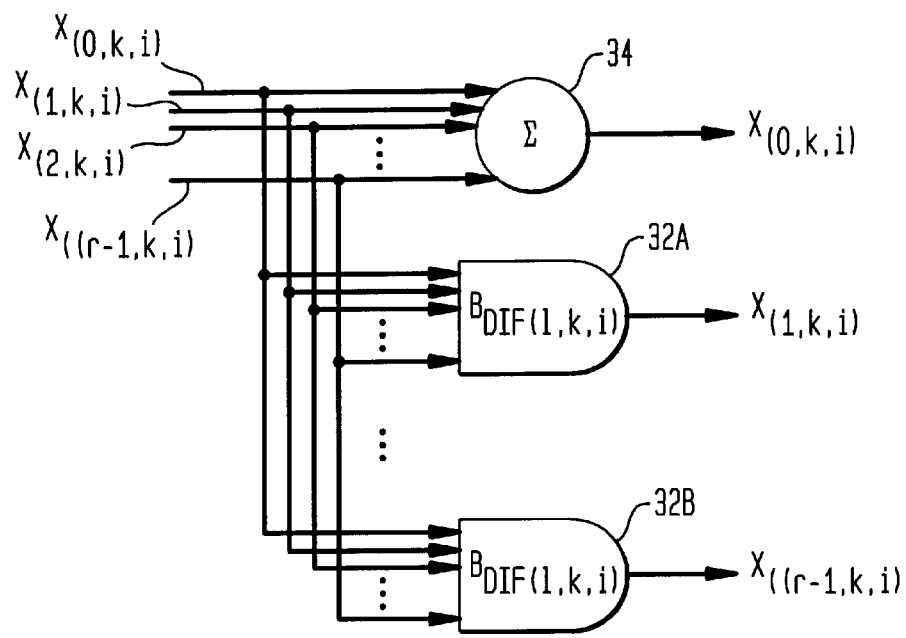
FIG. 5B is a schematic representation of a DIT butterfly in accordance with the present invention.

FIGS. 5A and 5B illustrate how each of the butterfly-processing elements (BPEs) represented by the specialized operators, $B_{DIF}$ and $B_{DIT}$ are arranged to form DIF and DIT butterflies respectively. In particular, FIG. 5A illustrates a DIF radix-r butterfly. In FIG. 5A, r butterfly-processing elements 30A, 30B, 30C are arranged in parallel. The inputs of each of the r BPEs 30A, 30B, 30C are respectively coupled to each respective input data point of the input sequence, x. The outputs of each of the r BPEs 30A, 30B, 30C are respectively coupled to each respective output data point of the output sequence, X. Each of the butterfly-processing elements (BPEs) 30A, 30B, 30C, which are operated in parallel, are substantially identical as shown in FIG. 4B.

FIG. 5B illustrates a radix-r DIT butterfly. In FIG. 5B, r−1 butterfly-processing elements 32A, 32B are arranged in parallel. The inputs of each of the r−1 BPEs 32A, 32B are respectively coupled to each respective input data point of the input sequence, x. The outputs of each of the r−1 BPEs 32A, 32B are respectively coupled to each respective output data point of the output sequence, X, except for $X_0$. Each of the BPEs 32A, 32B, which are operated in parallel, is substantially identical to the others as shown in FIG. 3B. Furthermore, an adder 34 is provided to generate the lower order output data point, $X_0$. The r input terminals of adder 34 are respectively coupled to each respective input data point of the input sequence, x. The output of adder 34 is coupled to the lower order output data point, $X_0$.

As shown in FIGS. 5A and 5B, the present radix-r FFT butterfly is composed of parallel computing elements. During the FFT calculation, the simultaneous execution of r butterflies in parallel on r separate processors is feasible during each FFT stage. Each the r parallel processors would always be executing the same instruction simultaneously, which is very desirable for implementation on some of the latest DSP cards. Trivial multiplications encountered during the execution of a particular butterflies (specific radices) may be avoided by simple checks on the coefficients addresses. Avoiding trivial multiplications reduces the computational load of particular butterflies. Trivial multiplications could also be controlled by hardware implementation by using a complex multiplier bypass for p=0, where the trivial multiplication could be computed by two simple multipliers.

Reduction in computation can be achieved, by controlling the trivial multiplication in each word when $((lmN/r + \tilde{N}(k/r^i)lr^i))_N$ or $((lmN/r^{(n-i)} + \tilde{N}(k/r^{(n-i)}) mr\ r^i))_N$ are equal to a multiple of N/r. As a result, the most significant advantage is that the multiplication by j and −j will be absorbed, yielding to a huge reduction in shifting and negating processes, and the only trivial multiplication left is the multiplication by 1 or −1. In this case the multiplier is by passed whenever the operators $\beta_{(i)}$ satisfies the condition of being a multiple N/r.

Furthermore, even when implemented on a single processor, rather than r parallel processors, the use of the present butterfly-processing elements (BPE's) to form a radix-r FFT butterfly is advantageous. In other words, it is beneficial to implement a single processor FFT butterfly with a minimum of hardware (complex multipliers and adders) to perform a complete FFT calculation.

As shown in tables I and II, below, a single processor of implementation leads to a huge reduction in time delay and complex multiplication as compared to that obtained by a conventional lower radices butterfly computation. Single processor implementations are advantageous for applications where low power consumption, low heat transfer and small size is needed.

Figure 6A:
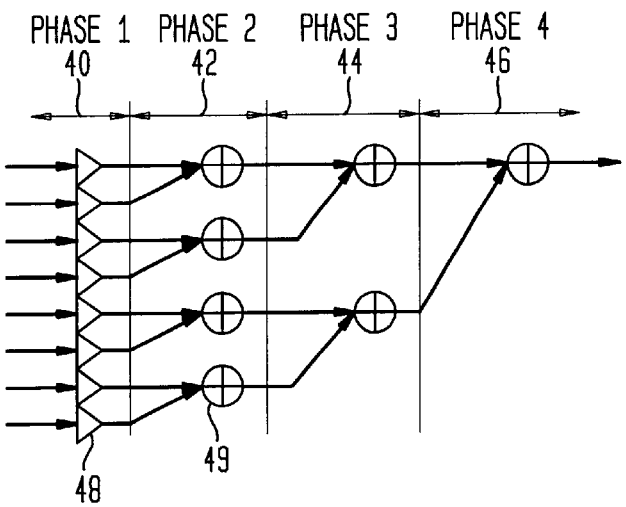
FIG. 6A is a schematic representation of a radix-8 DIT butterfly-processing element in accordance with the present invention.
Figure 6B:
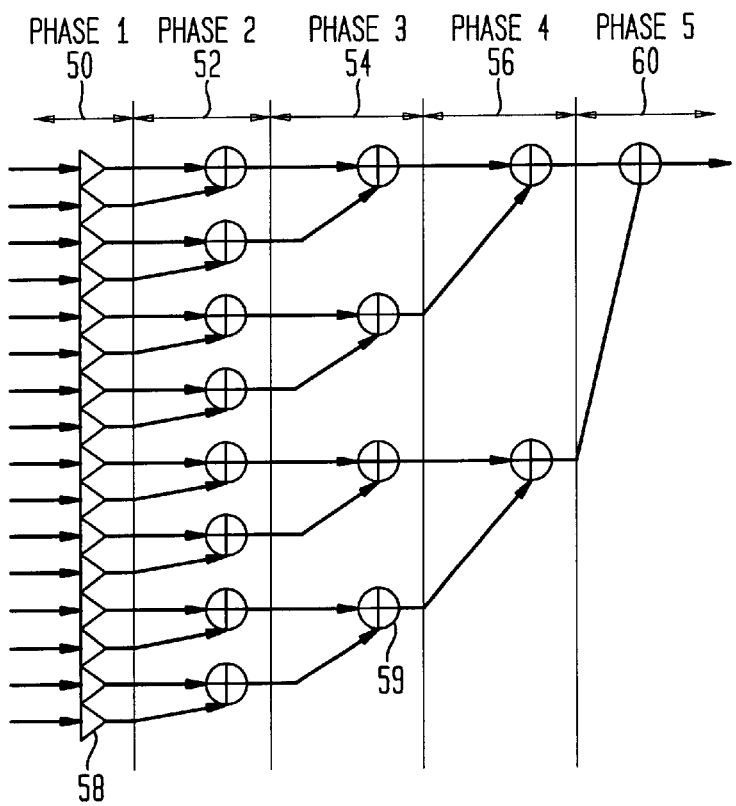
FIG. 6B is a schematic representation of a radix-16 DIF butterfly-processing element in accordance with the present invention.
Figure 9:
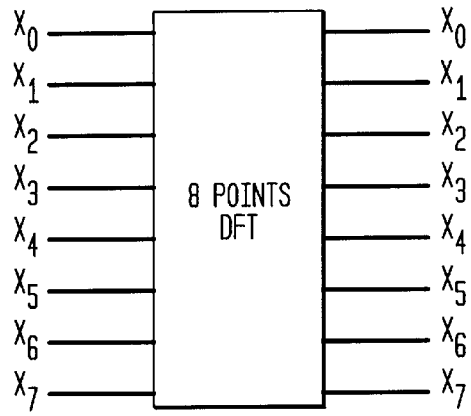
FIG. 9 is a block diagram representation of an 8-point DFT function.
Figure 10:
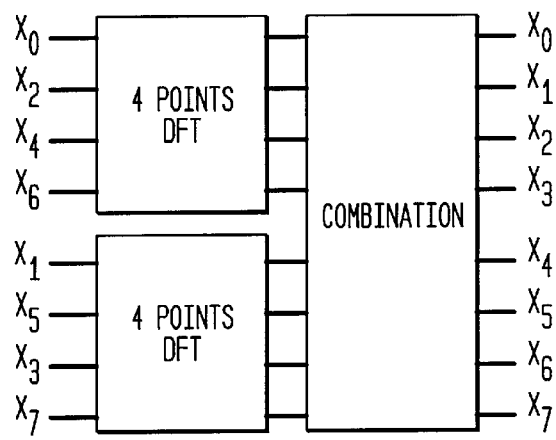
FIG. 10 is a block diagram representation of an 8-point DFT obtained by combining two 4-point DFTs.
Figure 11:
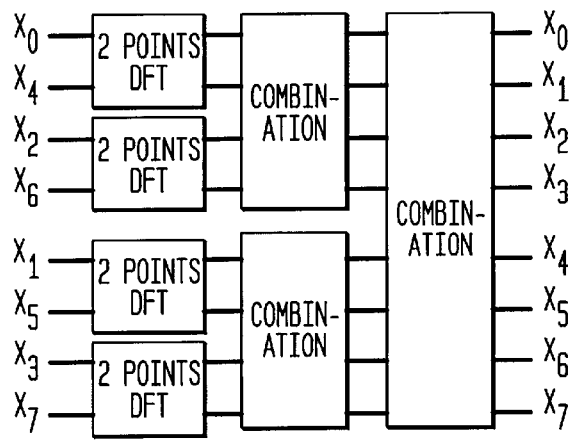
FIG. 11 is a block diagram representation of an 8-point DFT obtained by combining four 2-point DFTs.
Figure 12:
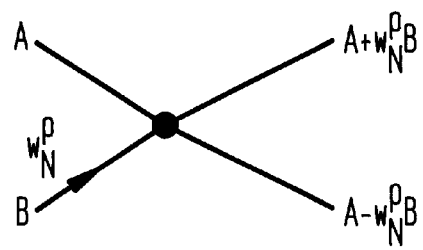
FIG. 12 is a schematic representation of a radix-2 butterfly computation.
Figure 13:
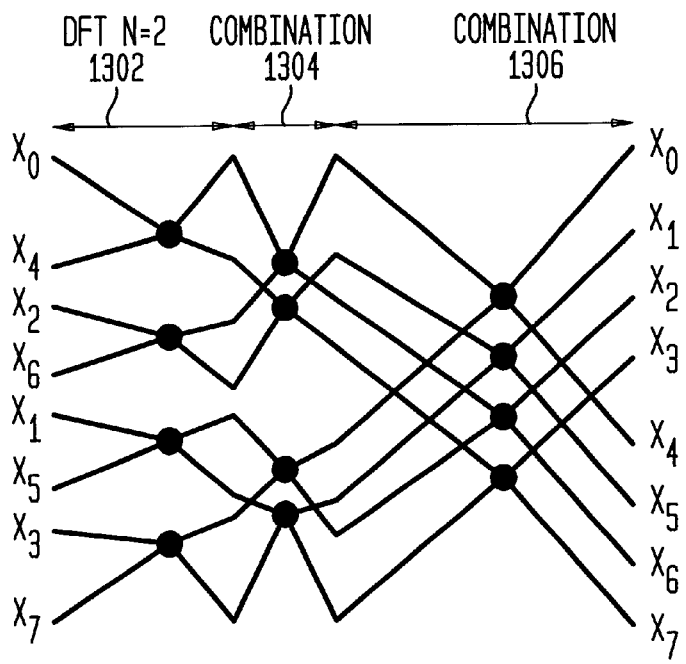
FIG. 13 is a signal flow graph illustrating an FFT calculation using 12 radix-2 butterflies to compute an 8-point FFT in three stages.
Figure 14:
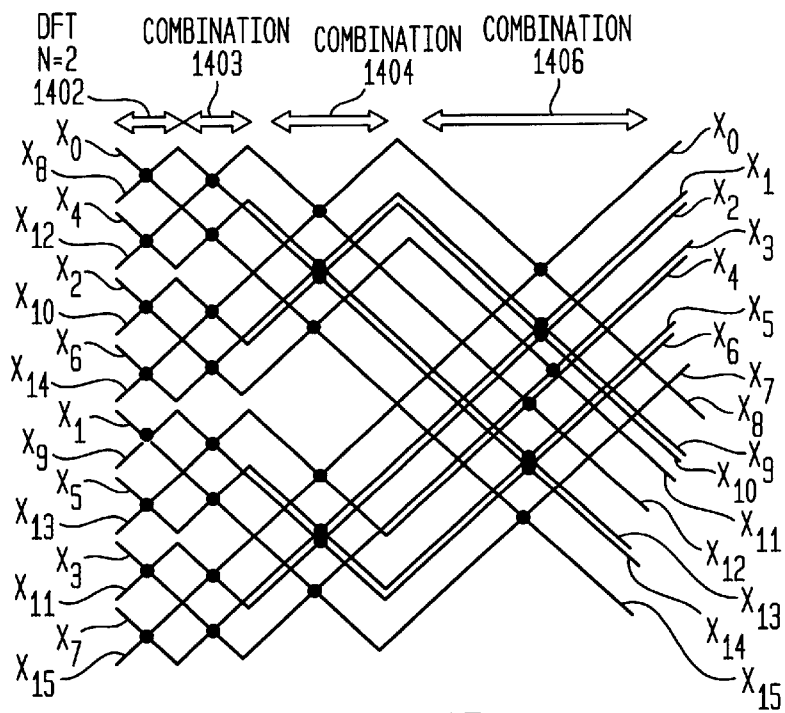
FIG. 14 is a signal flow graph illustrating an FFT calculation using 32 radix-2 butterflies to compute a 16-point FFT in 4 stages.
Figure 15:
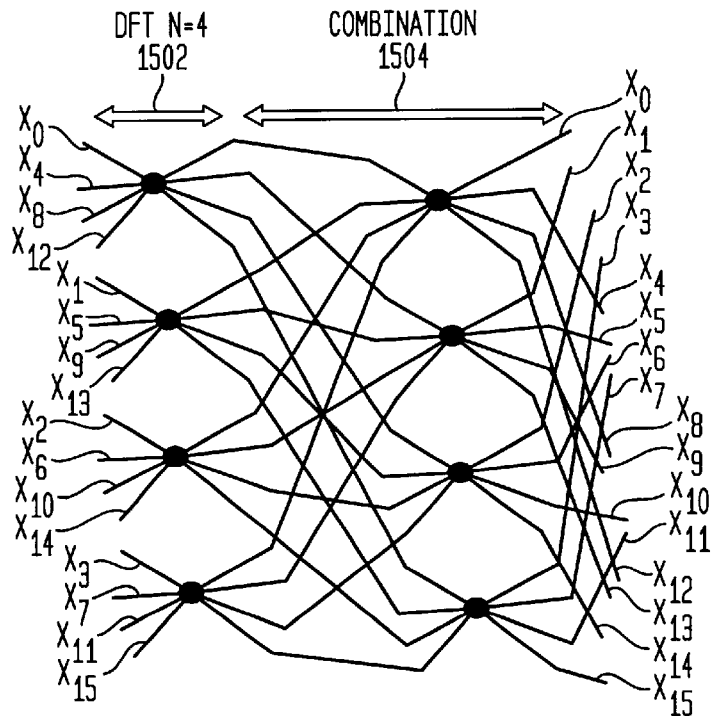
FIG. 15 is a signal flow graph illustrating an FFT calculation using 8 radix-4 butterflies to compute a 16-point FFT in two stages.

FIGS. 6A and 6B illustrate the regular internal structure of the present radix-r butterfly-processing element (BPE). A radix-8 DIT butterfly-processing element illustrated in FIG. 6A includes a plurality of 7 (r−1=7, where r=8) multipliers 48 and adders 49. The multipliers 48 correspond to the (r−1) multipliers 20A, 20B, 20C in FIG. 4A, and the adders 49 correspond to adder 24 in FIG. 4A. To compute each output data point, there are 4 phases of computation. In the first phase 40, multipliers 48 multiply each input data point by a coefficient retrieved from memory. Note that all of the coefficients required by multipliers 48 are retrieved within phase 1. In the next three phases 42, 44, 46, the outputs of the multipliers 48 are summed in adders 49, in pairs. That is, in the second phase 42, four pair of multiplier 48 outputs are added together. In the third phase 44 two pair of adder outputs from the second phase 42 are added together. In the fourth phase 46, one pair of adder outputs from the third phase 44 are added together to form a single output data point.

A radix-16 DIF butterfly-processing element illustrated in FIG. 6B includes a plurality of 16 multipliers 58 and adders 59. The 16 multipliers 58 correspond to the r multipliers 10A, 10B, 10C, 10D in FIG. 3A and the adders 59 correspond to adder 24 in FIG. 3A. To compute each output data point, there are 5 phases of computation. In the first phase 50, multipliers 58 multiply each input data point by a coefficient retrieved from memory. Note that all of the coefficients required by multipliers 58 are retrieved within phase 1. In the next four phases 52, 54, 56, 60, the outputs of the multipliers 58 are summed in adders 59, in pairs. That is, in the second phase 52, eight pair of multiplier 58 outputs are added together. In the third phase 54 four pair of adder outputs from the second phase 52 are added together. In the fourth phase 56, two pair of adder outputs from the third phase 54 are added together. In the fifth phase 60, one pair of adder outputs from the fourth phase 56 are added together to form a single output data point.

As can be seen from FIGS. 6A and 6B, multipliers 48, 58 may be implemented with parallel computing elements because the multiplications are occurring simultaneously in a single phase. Also, due to the regular structure of the DIT and DIF butterfly-processing elements, an increase in radix, is accommodated by an increase in the number of additional addition phases.

Thus, in applications where minimizing the overall FFT processing time is the most important factor, such as in real time signal processing applications, a parallel implementation of the radix-r butterfly is beneficial. As a trade off, parallel multiprocessor implementations generate a higher cost of implementation, an increase in the size of the components and an increase in the power consumption and heat transfer. Table III shows the importance of utilizing the ability of the present radix-r butterfly to realize parallel processor implementations where it has been shown to provide significant reduction in time delay, particularly at higher radices.

TABLE I

Workload in a 4096-point FFT for different radices by factoring the adder matrix.

| Requirements | Radix - 2 | Radix - 4 | Radix - 8 |
|---|---|---|---|
| Number of Phases | 2 | 4 | 7 |
| Memory accesses | 98304 | 24576 | 8192 |
| Number of complex multiplication | 24576 | 12288 | 8192 |
| Number of complex addition | 24576 | 12288 | 6144 |

TABLE II

Workload in a 4096-point FFT for different radices by using a single PE engine.

| Requirements | Radix - 8 | Radix - 16 |
|---|---|---|
| Number of Phases | 4 | 5 |
| Memory accesses | 8192 | 3072 |
| Number of complex multiplication | 16384 | 12288 |
| Number of complex addition | 49152 | 49152 |

TABLE III

Workload in a 4096-point FFT for different radices by implementing r parallel PEs engines.

| Requirements | Radix - 8 | Radix - 16 |
|---|---|---|
| Number of Phases | 4 | 5 |
| Memory accesses | 8192 | 3072 |
| Number of complex multiplication | 2048 | 768 |
| Number of complex addition | 6144 | 3072 |

Note: In the above table, computational savings by eliminating trivial multiplication was not taken into consideration to obtain the above results.

Hardware Reduction

A hardware reduction may be obtained because the adder matrix $T_r$ is a symmetric matrix. The operation of a radix-4 PE for the DIF FFT and the operation of a radix-4 PE for the DIT FFT are defined by:

$$\text{the colon vector } X_{(4,k,i)} = B_{4\ DIF} \times x = [X_{(D(k,i)}] \tag{22}$$

and $$\text{the colon vector } X_{(4,k,i)} = B_{4\ DIT} \times x = [X_{(D(k,i)}] \tag{23}$$

which are represented respectively by:

$$\begin{bmatrix} X_{(0,k,i)} \\ X_{(1,k,i)} \\ X_{(2,k,i)} \\ X_{(3,k,i)} \end{bmatrix} = \begin{bmatrix} x_{(0,k,i)} + x_{(1,k,i)} + x_{(2,k,i)} + x_{(3,k,i)} \\ w^{((\tilde{N}(k/4^i)4^i))}_N [x_{(0,k,i)} + w^{j(N/4)}_N x_{(1,k,i)} - x_{(2,k,i)} - w^{j(N/4)}_N x_{(2,k,i)}] \\ w^{((\tilde{N}(k/4^i)2\times 4^i))}_N [x_{(0,k,i)} - x_{(1,k,i)} + x_{(2,k,i)} - x_{(3,k,i)}] \\ w^{((\tilde{N}(k/4^i)3\times 4^i))}_N [x_{(0,k,i)} - w^{j(N/4)}_N x_{(1,k,i)} - x_{(2,k,i)} + w^{j(N/4)}_N x_{(3,k,i)}] \end{bmatrix} \tag{24}$$

Figure 2:
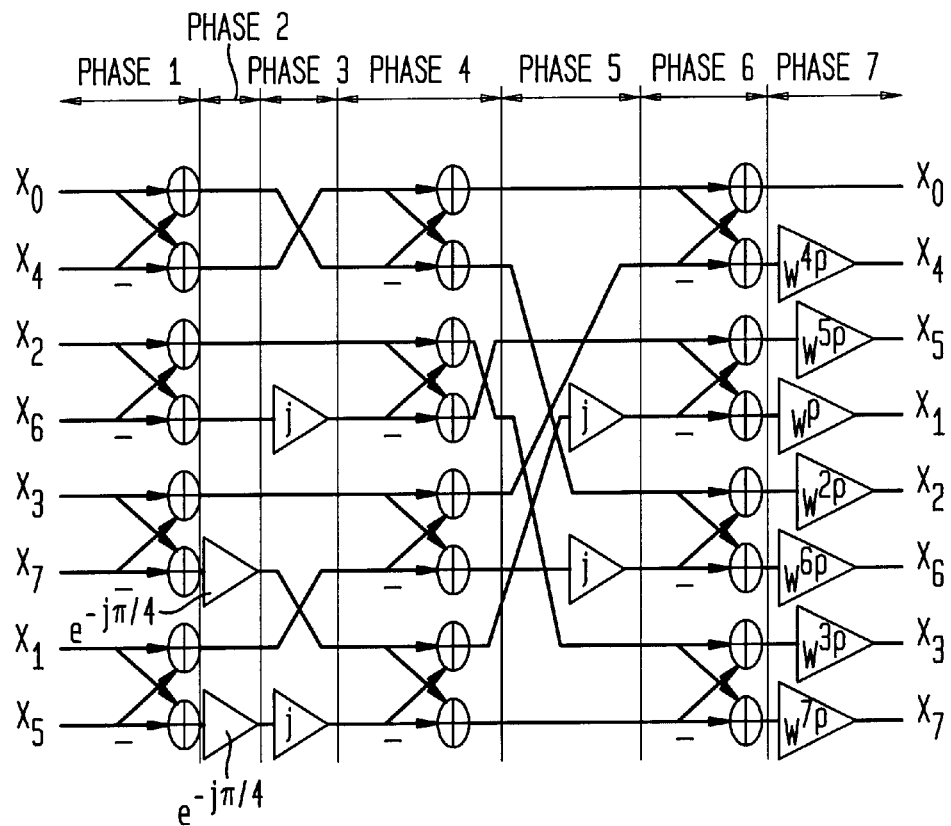
FIG. 2 is a signal flow graph of at radix-8 DIF butterfly in accordance with the prior art.

FIGS. 7 and 8 illustrate the hardware reductions in complex multipliers and adders obtained by increasing the complexity of the butterflies' structures. In both cases, the number of phases is reduced from four phases to three phases. In particular, the use of a $$\begin{bmatrix} X_{(0,k,i)} \\ X_{(1,k,i)} \\ X_{(2,k,i)} \\ X_{(3,k,i)} \end{bmatrix} = \begin{bmatrix} x_{(0,k,i)} + w^{((\tilde{N}(k/4^{(n-i)})4^{(n-i)}))_N} x_{(1,k,i)} + w^{((\tilde{N}(k/4^{(n-i)})2\times 4^{(n-i)}))_N} x_{(2,k,i)} + w^{((\tilde{N}(k/4^{(n-i)})3\times 4^{(n-i)}))_N} x_{(3,k,i)} \\ x_{(0,k,i)} + w^{((N/4+\tilde{N}(k/4^{(n-i)})4^{(n-i)}))_N} x_{(1,k,i)} - w^{((\tilde{N}(k/4^{(n-i)})2\times 4^{(n-i)}))_N} x_{(2,k,i)} - w^{((N/4+\tilde{N}(k/4^{(n-i)})3\times 4^{(n-i)}))_N} x_{(3,k,i)} \\ x_{(0,k,i)} - w^{((\tilde{N}(k/4^{(n-i)})4^{(n-i)}))_N} x_{(1,k,i)} + w^{((\tilde{N}(k/4^{(n-i)})2\times 4^{(n-i)}))_N} x_{(2,k,i)} - w^{((\tilde{N}(k/4^{(n-i)})3\times 4^{(n-i)}))_N} x_{(3,k,i)} \\ x_{(0,k,i)} - w^{((N/4+\tilde{N}(k/4^{(n-i)})4^{(n-i)}))_N} x_{(1,k,i)} + w^{((\tilde{N}(k/4^{(n-i)})2\times 4^{(n-i)}))_N} x_{(2,k,i)} + w^{((N/4+\tilde{N}(k/4^{(n-i)})3\times 4^{(n-i)}))_N} x_{(3,k,i)} \end{bmatrix}. \quad (25)$$

quasi-parallel structure reduces the time delay by one phase (for the radix-4 case) compared to the conventional butterfly implementation as shown in FIG. 1.

In FIG. 7, a first phase of a radix-4 DIF butterfly comprises four adders 70A, 70B, 70C, 70D, which are coupled to pairs of the four input data points, $x_0$, $x_1$, $x_2$, $x_3$. The second phase consists of multipliers, 72A, 72B, 72C, 72D, 72E, 72F. Each of the multiplier coefficients 1, 2, 3, 4, 5 corresponding to multipliers 72A, 72B, 72C, 72D, 72E, 72F respectively are given as follows:

$1 = w^{((\tilde{N}(k/4^i)4^i))_N}$, $2 = w^{((N/4+\tilde{N}(k/4^i)4^i))_N}$, $3 = w^{((\tilde{N}(k/4^i)2\times 4^i)3\times 4^i))_N}$,
$4 = w^{((\tilde{N}(k/4^i))_N}$, $5 = w^{((N/4+\tilde{N}(k/4^i)3\times 4^i))_N}$ The output of the multipliers 72A, 72B, 72C, 72D, 72E, 72F are input to adders 74A, 74B, 74C, 74D in the third phase. The output of the adders 74A, 74B, 74C, 74 are coupled to the output data points, $X_0$, $X_1$, $X_2$ and $X_3$.

In FIG. 8, a first phase of a radix-4 DIT butterfly comprises five multipliers 80A, 80B, 80C, 80D, 80D which are coupled to pairs of the four input data points, $x_0$, $x_1$, $x_2$, $x_3$. Each of the multiplier coefficients, 1, 2, 3, 4, 5 corresponding to multipliers 80A, 80B, 80C, 80D, 80D respectively are given as follows:

$1 = w^{((\tilde{N}(k/4^{(n-i)})4^{(n-i)}))_N}$, $2 = w^{((N/4+\tilde{N}(k/4^{(n-i)})4^{(n-i)}))_N}$, $3 = w^{((\tilde{N}(k/4^{(n-i)})2\times 4^{(n-i)}))_N}$, $4 = w^{((\tilde{N}(k/4^{(n-i)})3\times 4^{(n-i)}))_N}$, $5 = w^{((n/4+\tilde{N}(k/4^{(n-i)})3\times 4^{(n-i)}))_N}$ The outputs of the multipliers 80A, 80B, 80C, 80D, 80D are coupled to adders, 82A, 82B, 82C, 82D in the second phase of butterfly computation. The output of adders 82A, 82B, 82C, 82D are coupled to adders 84A, 84B, 84C, 84D in the third phase, the outputs of which, are coupled to the output data points, $X_0$, $X_1$, $X_2$ and $X_3$.

Comparing the radix-4 DIT butterfly of FIG. 8 to the prior art radix-4 DIT butterfly of FIG. 1, it can be seen that the butterfly of FIG. 8 has fewer phases. In addition, the multipliers in the butterfly of FIG. 8 are grouped in one phase for parallel computation, while the multipliers in the butterfly of FIG. 1 appear in two phases (phase 1 and phase 3). Accordingly, an FFT implementation using the radix-4 DIT butterfly of FIG. 8 will be faster than an FFT implementation using the radix-4 DIT butterfly of FIG. 1. Similarly, in FIG. 7, all the multipliers 72A–72F appear in phase 2, with only addition in phase 1 and phase 3. By grouping all the multiply calculations in one phase and all the addition calculations in the remaining phases, the total number of calculations is reduced and the degree of parallelism is increased.

Address Generation for the Ordered Input Ordered Output DIT Algorithm

For the DIT version of the FFT, the input sequence $x_{(n)}$ for the first iteration is partitioned into r sequences each of length (N/r) samples in the following manner:

$$x_{0(n)} = x_{(m)} \quad n = 0, 1, \ldots, \frac{N}{r} - 1. \quad (26)$$

$$x_{1(n)} = x_{(m+1)} \quad n = 0, 1, \ldots, \frac{N}{r} - 1.$$

$$x_{(r-1)(n)} = x_{(m+(r-1))} \quad n = 0, 1, \ldots, \frac{N}{r} - 1.$$

During an FFT process, the data (or words) had to be stored or accessed in a shuffled order that varies from one iteration to the other. Then, in order to have the output sequence in a natural order, the data has to be permutated, which is the same for all iterations. A control unit, through reading and writing address generators, controls the permutation and shuffling processes.

The control unit should be in a hierarchy of small easily implemented, co-operating control processes, which gives a well-structured, efficient control unit. The main task of the control unit is to compute the addresses for reading and writing data to the memories and to fetch the necessary twiddle factor exponents.

Figure 16:
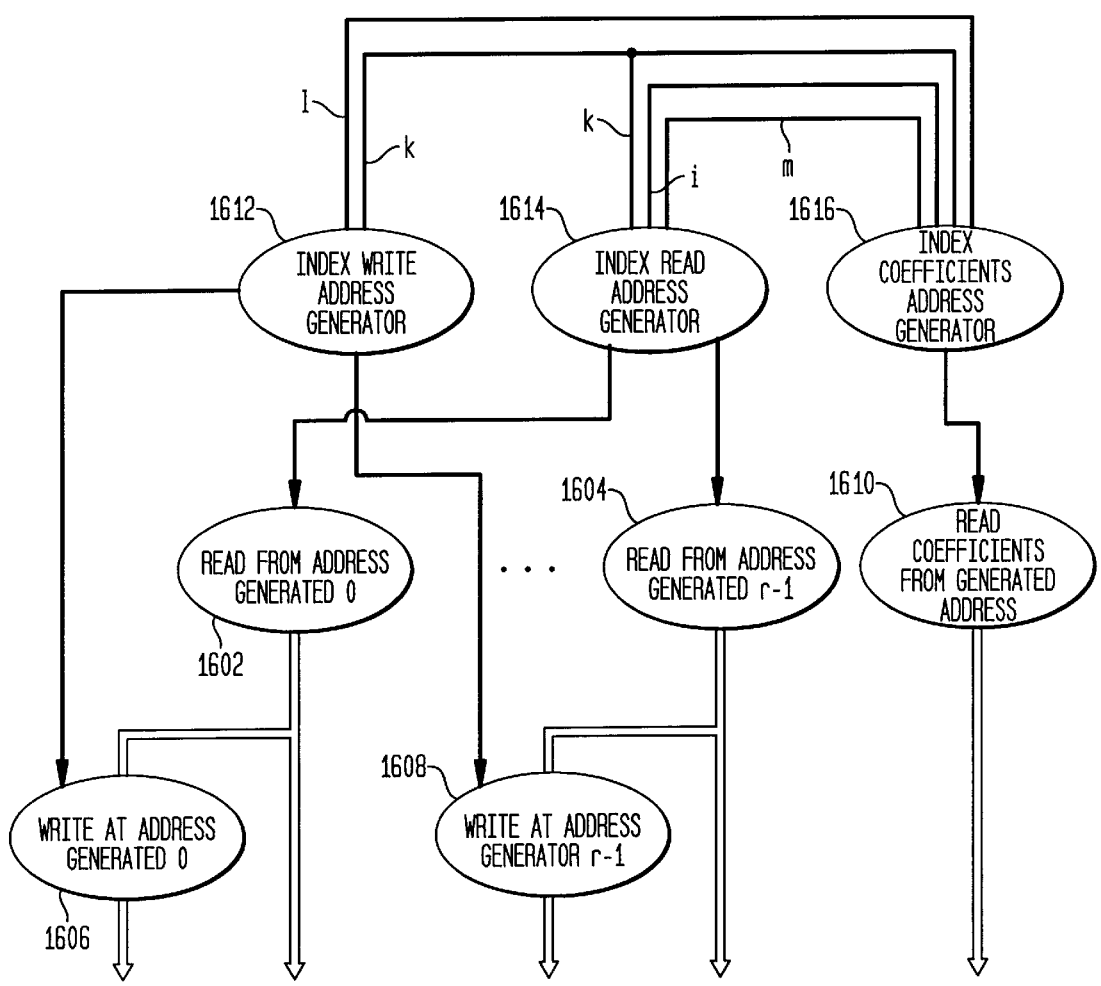
FIG. 16 is a block diagram of an address generator in accordance with the present invention.

A block diagram of the address generator is illustrated in FIG. 16. From the current indexes, the twiddle factors, the reading addresses and the writing addresses are derived. The read and write address generators consist of three counters each, meanwhile the write address generators consists of one counter. The role of the counters is to compute the memory address from current indexes in order to access the memory locations from the twiddle factor exponent.

The write index generator 1612 is responsive to the l and k indices to generate write addresses 1606 and 1608. The read index generator 1614 is responsive to the m, k and i indices to generate read addresses 1602 and 1604. The index generator 1616 is responsive to the l, m, k and i indices to generate the twiddle factors 1610.

In particular, the $m^{th}$ BPE input $x_{(m)}$ of the $k^{th}$ word at the $i^{th}$ iteration is fed to the $m^{th}$ BPE input by the reading address $r_{m_{(k,i)}}$:

$$r_{m_{(k,i)}} = m \times \left(\frac{N}{r^{(i+1)}}\right) + ((k))_{r^{n-i}} + \tilde{N}(k/r^{(n-i)}) \times r^{(n+1-i)}, \quad (27)$$

and the $l^{th}$ processed BPE output $X_{(l, k, i)}$ for the $k^{th}$ word at the $i^{th}$ iteration is stored by the writing address generator $w_{(r, k)}$ derived by the following expression:

$$w_{(r, k)} = l(N/r) + k \quad (28),$$

for m=l=0,1, . . . , r−1.

Address generation for the ordered input ordered output DIF Algorithm Similarly to the address generator for the DIT FFT, the input sequences for the DIF FFT are fed to the BPEs input by the following reading address generator:

$$r_{m(k,i)} = m \times (N/r) + k \text{ for } i=0 \tag{29}$$

$$r_{m(k,i)} = m \times \frac{N}{r^2} + \left(\left(\tilde{N}\left(\frac{k}{r^{i-1}}\right) \times \frac{N}{r}\right)\right)_N + ((k))_{r^{i-1}} + \tilde{N}\left(\frac{k}{r^i}\right) \times r^{i-1} \tag{30}$$

for $i > 0$, and the $l^{th}$ processed BPEs output $X_{(l)}$ for the $k^{th}$ word at the $i^{th}$ iteration is stored by the writing address generator $W_{(r, k)}$ expressed in equation (28).

What is claimed is:

1. A processing element for use in a decimation in frequency radix-r butterfly responsive to a plurality of input data points, said radix-r butterfly providing a plurality of output data points, said processing element comprising:
    a plurality of multipliers, each of said multipliers having a respective first and second input terminals and a respective output terminal; and
    an adder having a plurality of input terminals and an output terminal, each of said plurality of input terminals of said adder being coupled to a respective one of said output terminals of said plurality of multipliers;
    said plurality of first input terminals of said plurality of multipliers each being respectively coupled to one of said plurality of input data points, said output terminal of said adder being coupled to one of said plurality of output data points
    said plurality of second input terminals of said plurality of multipliers being coupled to a set of coefficients derived from the product of an adder matrix $T_r$ and a twiddle factor matrix $W_N^r$.

2. A processing element in accordance with claim 1, wherein said coefficients derived from the product of said adder matrix $T_r$ and said twiddle factor matrix $W_N^r$, are substantially given by $$T_r = \begin{bmatrix} w^0 & w^0 & w^0 & - & w^0 \\ w^0 & w^{N/r} & w^{2N/r} & - & w^{(r-1)N/r} \\ w^0 & w^{2N/r} & w^{4N/r} & - & w^{2(r-1)N/r} \\ - & - & - & - & - \\ w^0 & w^{(r-1)N/r} & - & - & w^{(r-1)^2 N/r} \end{bmatrix} = [T_{(l,m)}], \tag{28}$$

where $T_{(l,m)} = w^{((lm\frac{N}{r}))_N}$, $\tag{29}$ and defining $W_{(r, k, i)}$ the set of the twiddle factor matrices $W_N^r$ as:

$$W_{(r,k,i)} = \begin{bmatrix} w_{(0,k,i)} & 0 & - & 0 \\ 0 & w_{(1,k,i)} & - & 0 \\ - & - & - & - \\ 0 & 0 & - & w_{((r-1),k,i)} \end{bmatrix} = [w_{(l,m)(k,i)}], \tag{8}$$

in which, $$w_{(l,m)(k,i)} = w^{((\tilde{N}(\frac{k}{r^i})lr^i))_N} \text{ for } l = m, \text{ and } 0 \text{ elsewhere}, \tag{9}$$

wherein, $$B_{r \, DIF} = W_{(r,k,i)} \times T_r = [B_{r \, DIF(l,m)(k,i)}] \tag{10}$$

with $B_{r \, DIF(l,m)(k,i)} = w^{((lmN/r + \tilde{N}(k/r^i)lr^i))_N}$ $\tag{11}$ $l=m=0, \ldots, r-1, i=0,1 \ldots, n-1, k=0,1 \ldots, (N/r)-1, ((x))_N$ denotes x modulo N and $\tilde{N}(k/r^i)$ is defined as the integer part of the division of k and $r^i$, whereby the operation of said processing element for said decimation in frequency radix-r butterfly is:

the colon vector $X_{(r,k,i)} = B_{r \, DIF} \times x = [X_{(l)(k,i)}]$ $\tag{12}$, where the $l^{th}$ output $$X_{(l)(k,i)} = \sum_{m=0}^{r-1} x_{(m)} w^{((lmN/r + \tilde{N}(k/r^i)lr^i))_N}. \tag{13}$$

3. A processing element in accordance with claim 1, said processing element further comprising a plurality of calculation phases, wherein said plurality of multipliers operate during a first calculation phase of said plurality of calculation phases, and said plurality of adders operate during said plurality of calculation phases other than said first calculation phase.

4. A decimation in frequency radix-r butterfly comprising:
    a plurality of r processing elements each comprising:
        a plurality of multipliers, each of said multipliers having a respective first and second input terminals and a respective output terminal; and
        an adder having a plurality of input terminals and an output terminal, each of said plurality of input terminals of said adder being coupled to a respective one of said output terminals of said plurality of multipliers;
        said plurality of second input terminals of said plurality of multipliers being coupled to a set of coefficients derived from the product of an adder matrix $T_r$ and a twiddle factor matrix $W_N^r$;
    a plurality of r butterfly input terminals; $x_n$;
    a plurality of r butterfly output terminals, $X_r$;
    each of said plurality of r butterfly input terminals, $x_n$ being coupled to a respective first input terminal of each of said plurality of r processing elements corresponding to said respective first input terminals of said plurality of multipliers; and
    each of said output terminals of said plurality of r processing elements corresponding to said output terminal of said respective adder being coupled to a respective one of said plurality of r butterfly output terminals, $X_r$.

5. A processing element for use in a decimation in time radix-r butterfly responsive to a plurality of r input data points, said radix-r butterfly providing a plurality of output data points, said processing element comprising:
    a plurality of r−1 multipliers, each of said r−1 multipliers having a respective first and second input terminals and a respective output terminal; and
    an adder having a plurality of r input terminals and an output terminal, one of said plurality of r input terminals of said adder being coupled to a first input data point of said plurality of r input data points, each of the r−1 others of said plurality of r input terminals of said adder being coupled to a respective one of said output terminals of said plurality of r−1 multipliers;
    said r−1 plurality of first input terminals of said r−1 plurality of multipliers each being respectively coupled to one of r−1 of said plurality of r input data points, said output terminal of said adder being coupled to one of said plurality of output data points; and
    said plurality of second input terminals of said r−1 plurality of multipliers being coupled to a set of coefficients derived from the product of an adder matrix $T_r$ and a twiddle factor matrix $W_N^r$.

6. A processing element in accordance with claim 5, wherein said coefficients derived from the product of said adder matrix $T_r$ and said twiddle factor matrix $W_N^r$, are substantially given by, $$B_{r\ DIT} = T_r \times W_{(r,k,i)} = [B_{r\ DIT(l,m)(k,i)}] \quad (14),$$

in which $B_{r\ DIT(l,m)(k,i)} = w^{((lmN/r + \tilde{N}(k/r^{(n-i)})mr^{(n-i)}))_N} \quad (15),$ and $$W_{(r,k,i)} = \begin{bmatrix} w_{(0,k,i)} & 0 & - & 0 \\ 0 & w_{(1,k,i)} & - & 0 \\ - & - & - & - \\ 0 & 0 & - & w_{((r-1),k,i)} \end{bmatrix} = [w_{(l,m)(k,i)}], \quad (16)$$

where $w_{(l,m)(k,i)} = w^{((\tilde{N}(k/r^{(n-i)})mr^{(n-i)}))_N}$ for l=m, and 0 elsewhere (17) and n=(log N/log r)−1, whereby the operation of said processing element for said decimation in time radix-r butterfly is:

the colon vector $X_{(r,k,i)} = B_{r\ DIT} \times x = [X_{(l)(k,i)}] \quad (18),$ where the $l^{th}$ output $$X_{(l)(k,i)} = \sum_{m=0}^{r-1} x_{(m)} w^{((lmN/r + \tilde{N}(k/r^{(n-i)})mr^{(n-i)}))_N}. \quad (19)$$

7. A processing element in accordance with claim 5, said processing element further comprising a plurality of calculation phases, wherein said plurality of multipliers operate during a first calculation phase of said plurality of calculation phases, and said plurality of adders operate during said plurality of calculation phases other than said first calculation phase.

8. A decimation in time radix-r butterfly comprising:
 a plurality of r butterfly input terminals; $x_n$;
 a plurality of r butterfly output terminals, $X_r$;
 a plurality of r−1 processing elements, each comprising:
  a plurality of r−1 multipliers, each of said r−1 multipliers having a respective first and second input terminals and a respective output terminal; and
  an adder having a plurality of r input terminals and an output terminal, one of said plurality of r input terminals of said adder being coupled to a first input data point of said plurality of r butterfly input terminals; $x_n$, each of the r−1 others of said plurality of r input terminals of said adder being coupled to a respective one of said output terminals of said plurality of r−1 multipliers;
  said r−1 plurality of first input terminals of said r−1 plurality of multipliers each being respectively coupled to one of r−1 of said plurality of r butterfly input terminals; $x_n$; said output terminal of said adder being coupled to one of said plurality of r butterfly output terminals, $X_r$; and
  said plurality of second input terminals of said r−1 plurality of multipliers being coupled to a set of coefficients derived from the product of an adder matrix $T_r$ and a twiddle factor matrix $W_N^r$;
 a second adder having a plurality of r input terminals and an output terminal, said output terminal thereof coupled to a first one of said plurality of r butterfly output terminals, $X_r$; and
 each of said plurality of r input terminals of said second adder being coupled to a respective one of said plurality of r butterfly input terminals, $x_n$.

9. A radix-r butterfly, where radix r is equal to or greater than 4, responsive to a plurality of input data points and having a plurality of calculation phases, said radix-r butterfly further providing a plurality of output data points, said radix-r butterfly comprising:
 a first plurality of multipliers; and
 a second plurality of adders, wherein
  said first plurality of multipliers operate substantially simultaneously during a given calculation phase of said plurality of calculation phases to perform substantially all required multiplications of said radix-r butterfly during said given calculation phase, and
  said second plurality of adders operate during said plurality of calculation phases other than said given calculation phase.

10. A radix-r butterfly in accordance with claim 9, wherein said given calculation phase is the first calculation phase.

11. A radix-r butterfly responsive to a plurality of input data points and having a plurality of calculation phases, said radix-r butterfly further providing a plurality of output data points, said radix-r butterfly comprising:
 a first plurality of multipliers; and
 a second plurality of adders, wherein
  said first plurality of multipliers operate substantially simultaneously during a given calculation phase of said plurality of calculation phases, and said second plurality of adders operate during said plurality of calculation phases other than said given calculation phase,
 wherein said plurality of multipliers are coupled to a set of coefficients derived from the product of an adder matrix $T_r$ and a twiddle factor matrix $W_N^r$.

12. A radix-r butterfly in accordance claim 11, wherein said coefficients derived from the product of said adder matrix $T_r$ and said twiddle factor matrix $W_N^r$, are substantially given by $$T_r = \begin{bmatrix} w^0 & w^0 & w^0 & - & w^0 \\ w^0 & w^{N/r} & w^{2N/r} & - & w^{(r-1)N/r} \\ w^0 & w^{2N/r} & w^{4N/r} & - & w^{2(r-1)N/r} \\ - & - & - & - & - \\ w^0 & w^{(r-1)N/r} & - & - & w^{(r-1)^2 N/r} \end{bmatrix} = [T_{(l,m)}], \quad (28)$$

where $T_{(l,m)} = w^{((lm\frac{N}{r}))_N}, \quad (29)$ and defining $W_{(r,k,i)}$ the set of the twiddle factor matrices $W_N^r$ as:

$$W_{(r,k,i)} = \begin{bmatrix} w_{(0,k,i)} & 0 & - & 0 \\ 0 & w_{(1,k,i)} & - & 0 \\ - & - & - & - \\ 0 & 0 & - & w_{((r-1),k,i)} \end{bmatrix} = [w_{(l,m)(k,i)}], \quad (8)$$

in which, $$w_{(l,m)(k,i)} = w^{((\tilde{N}(\frac{k}{r^i})lr^i))_N} \text{ for } l = m, \text{ and 0 elsewhere}, \quad (9)$$

wherein, $$B_{r\ DIF} = W_{(r,k,i)} \times T_r = [B_{r\ DIF(l,m)(k,i)}] \quad (10)$$

with $B_{r\ DIF(l,m)(k,i)} = w^{((lmN/r + \tilde{N}(k/r^i)lr^i))_N} \quad (11),$ l=m=0, . . . , r−1, i=0,1 . . . , n−1, k=0,1 . . . , (N/r)−1,$((x))_N$ denotes x modulo N and $\tilde{N}$ (k/r$^i$) is defined as the integer part of the division of k and $r^i$, whereby the operation of said processing element for said decimation in frequency radix-r butterfly is:

$$\text{the colon vector } X_{(r,k,i)} = B_{r\ DIF} \times x = [X_{(l)(k,i)}] \quad (12),$$

where the $l^{th}$ output $$X_{(l)(k,i)} = \sum_{m=0}^{r-1} x_{(m)} w^{((lmN/r + \bar{N}(k/r^i)lr^i))_N}. \quad (13)$$

13. A radix-r butterfly in accordance claim 11, wherein said coefficients derived from the product of said adder matrix $T_r$ and said twiddle factor matrix $W_N^r$, are substantially given by, $$B_{r\ DIT} = T_r \times W_{(r,k,i)} = [B_{r\ DIT(l,m)(k,i)}] \quad (14),$$

in which $B_{r\ DIT(l,m)(k,i)} = w^{((lmN/r + \bar{N}(k/r^{(n-i)})mr^{(n-i)}))_N}$ (15), and $$W_{(r,k,i)} = \begin{bmatrix} w_{(0,k,i)} & 0 & - & 0 \\ 0 & w_{(1,k,i)} & - & 0 \\ - & - & - & - \\ 0 & 0 & - & w_{((r-1),k,i)} \end{bmatrix} = [w_{(l,m)(k,i)}], \quad (16)$$

where $w_{(l,m)(k,i)-w}^{((\bar{N}(k/r^{(n-i)})mr^{(n-i)}))_N}$ for $l=m$, and 0 elsewhere (17), and $n = (\log N / \log r) - 1$, whereby the operation of said processing element for said decimation in time radix-r butterfly is:

$$\text{the colon vector } X_{(r,k,i)} = B_{r\ DIT} \times x = [X_{(l)(k,i)}] \quad (18),$$

where the $l^{th}$ output $$X_{(l)(k,i)} = \sum_{m=0}^{r-1} x_{(m)} w^{((lmN/r + \bar{N}(k/r^{(n-i)})mr^{(n-i)}))_N}. \quad (19)$$

14. A decimation in frequency radix-4 butterfly responsive to a plurality of input data points and having first, second and third calculation phases, said radix-r butterfly further providing a plurality of output data points, said radix-r butterfly comprising:

a first plurality of adders;

a second plurality of multipliers; and a third plurality of adders, wherein said second plurality of multipliers operate substantially simultaneously during said second calculation phase to perform substantially all required multiplications of said decimation in frequency radix-4 butterfly, said first plurality of adders operate during said first calculation phase and said third plurality of adders operate during said third calculation phase.

15. A decimation in time radix-4 butterfly responsive to a plurality of input data points and having first, second and third calculation phases, said radix-r butterfly further providing a plurality of output data points, said radix-r butterfly comprising:

a first plurality of multipliers; and second plurality of adders; and a third plurality of adders, wherein said first, plurality of multipliers operate substantially simultaneously during said first calculation phase to perform substantially all required multiplications of said decimation in frequency radix-4 butterfly, said second plurality of adders operate during said second calculation phase and said third plurality of adders operate during said third calculation phase.

* * * * *